Sept. 6, 1949.  L. F. STRADER  2,480,887
APPARATUS FOR CATALYST REGENERATION
Filed June 20, 1945  6 Sheets-Sheet 1

INVENTOR
Leroy F. Strader
BY
Pennie, Davis, Marvin & Edmonds
ATTORNEYS

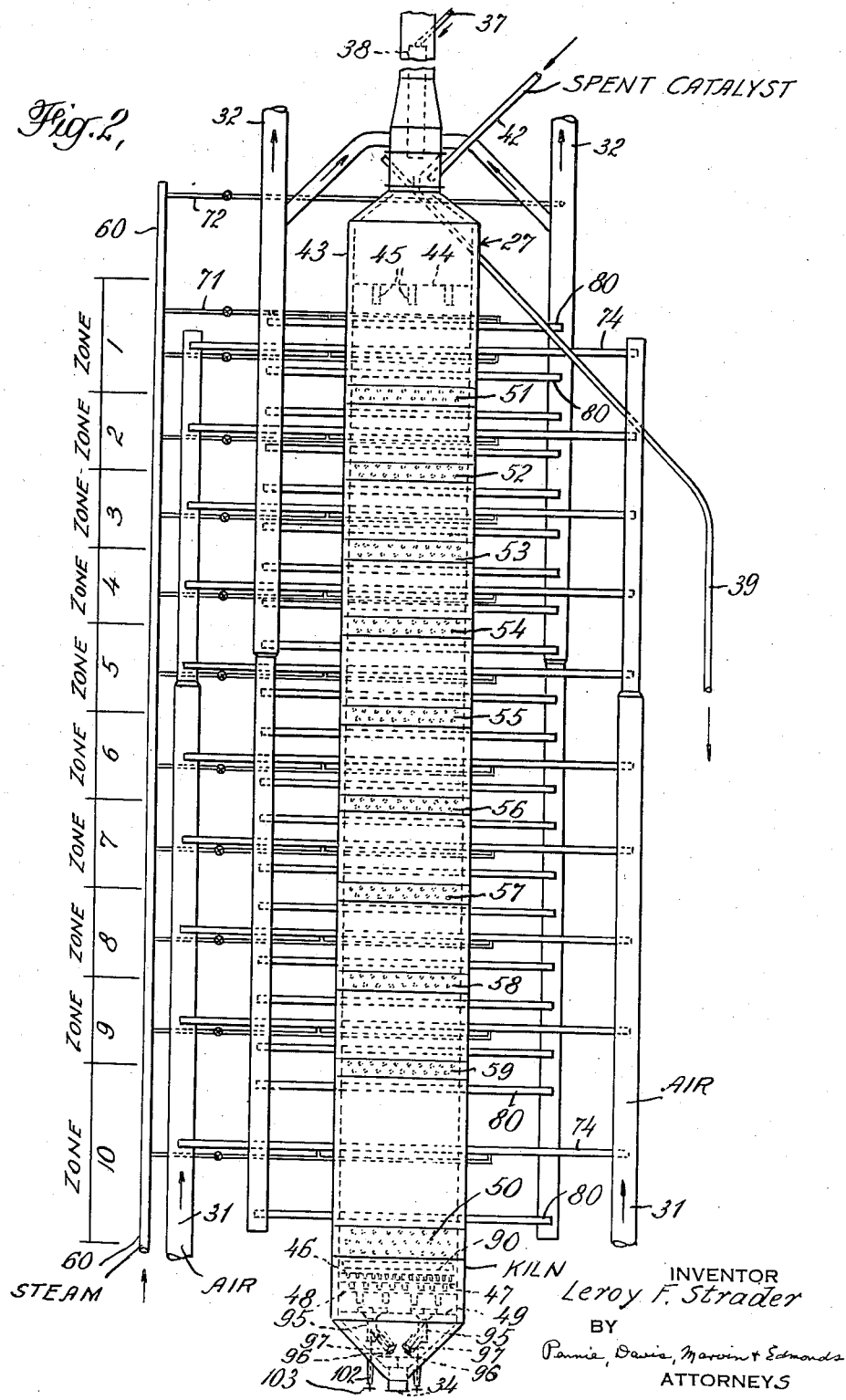

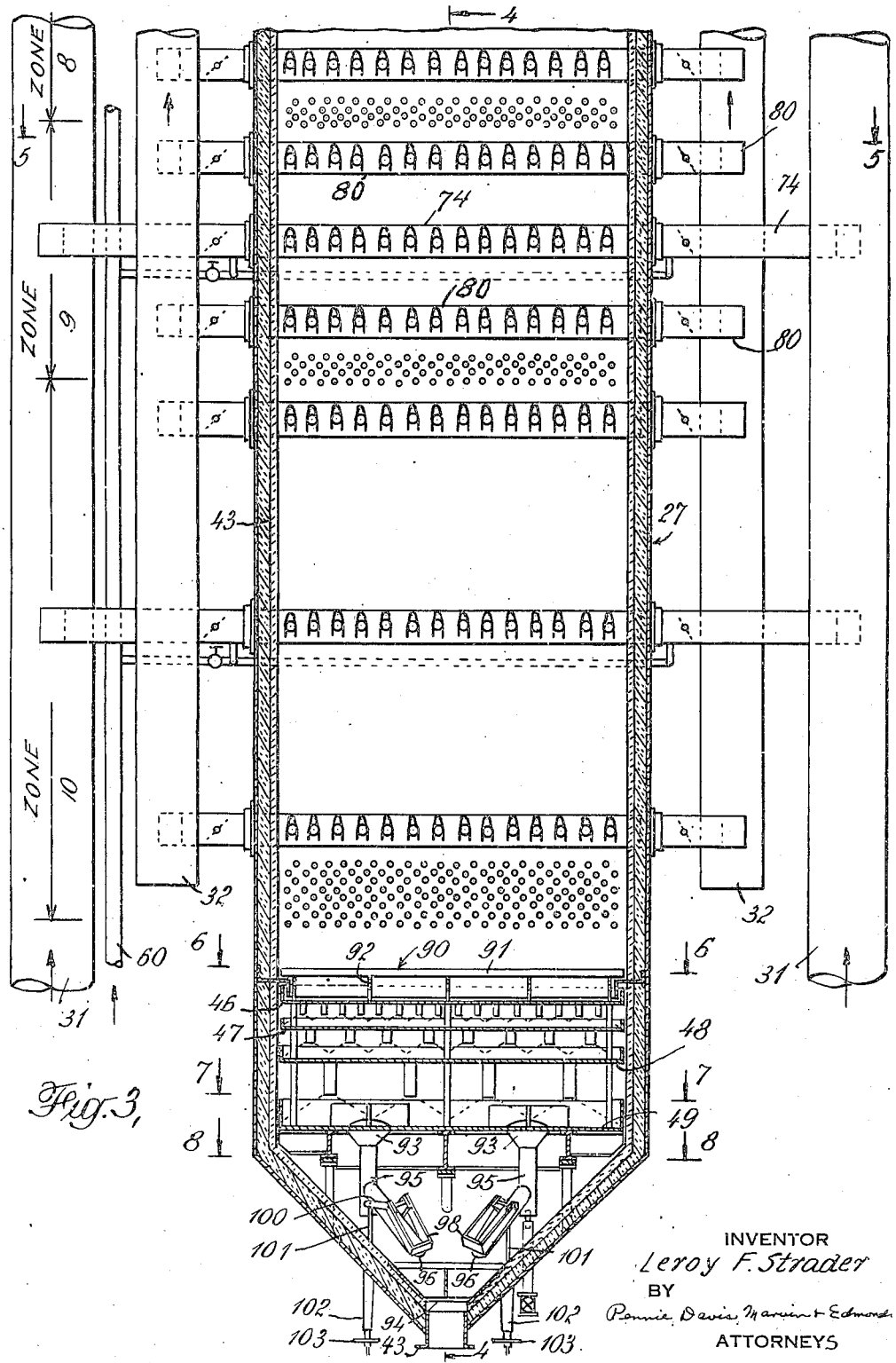

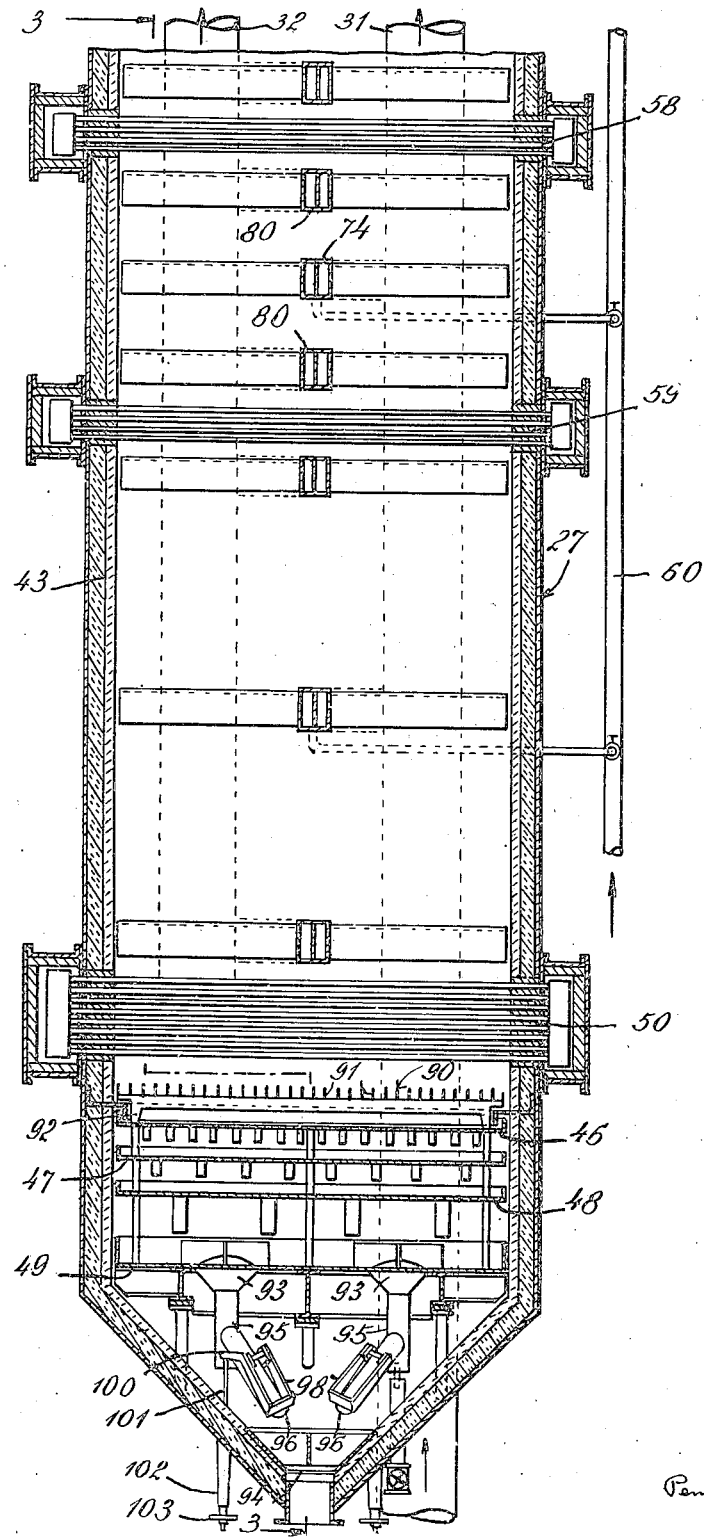

Sept. 6, 1949. L. F. STRADER 2,480,887
APPARATUS FOR CATALYST REGENERATION
Filed June 20, 1945 6 Sheets-Sheet 5
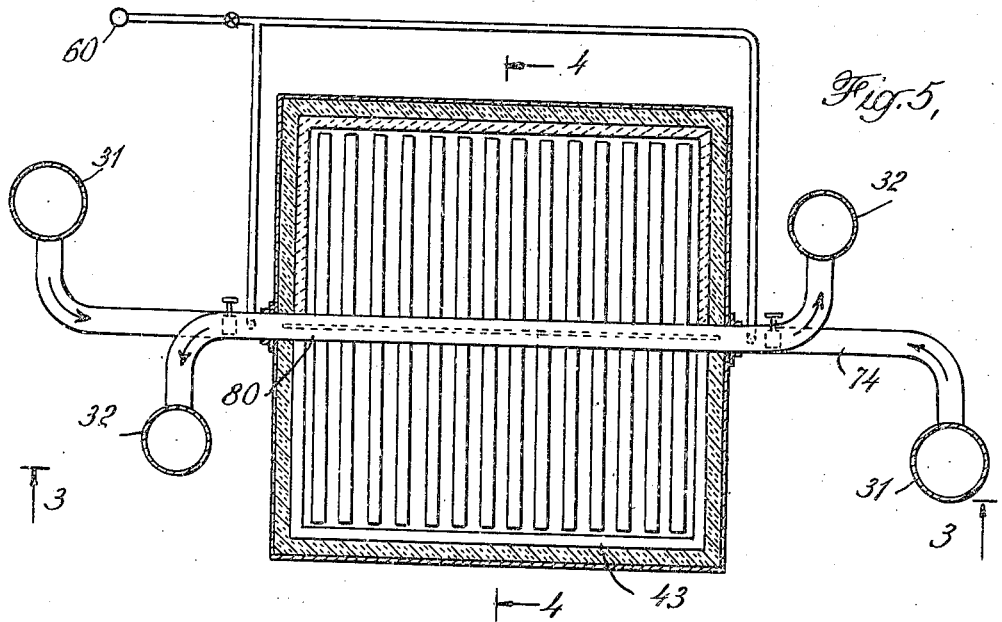
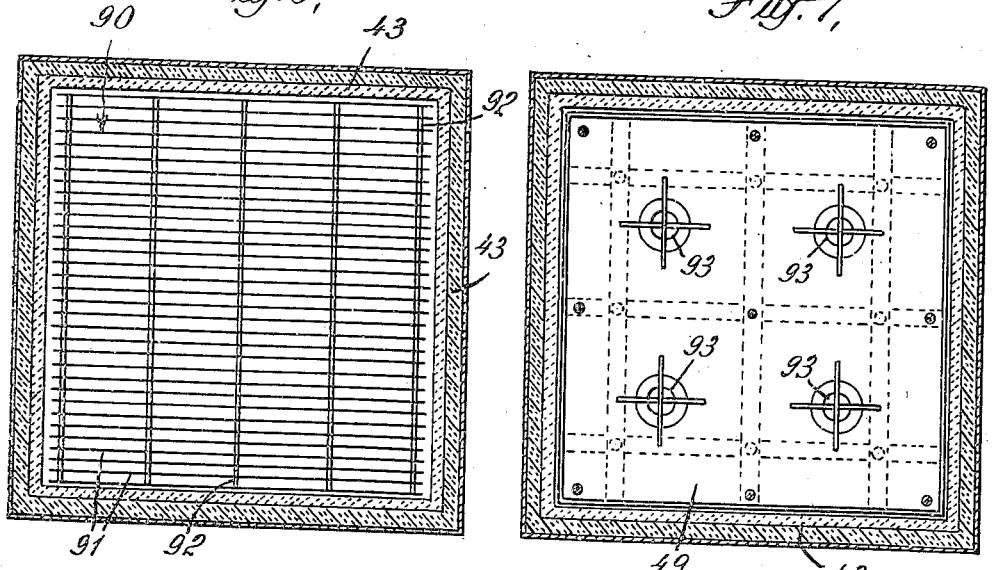
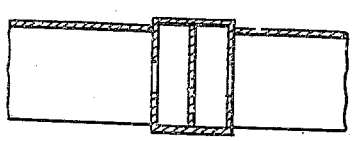
INVENTOR
Leroy F. Strader
BY
Pennie, Davis, Marvin & Edmonds
ATTORNEYS Sept. 6, 1949.　　　　　　　　L. F. STRADER　　　　　　2,480,887
APPARATUS FOR CATALYST REGENERATION
Filed June 20, 1945　　　　　　　　　　　　　　　　6 Sheets-Sheet 6
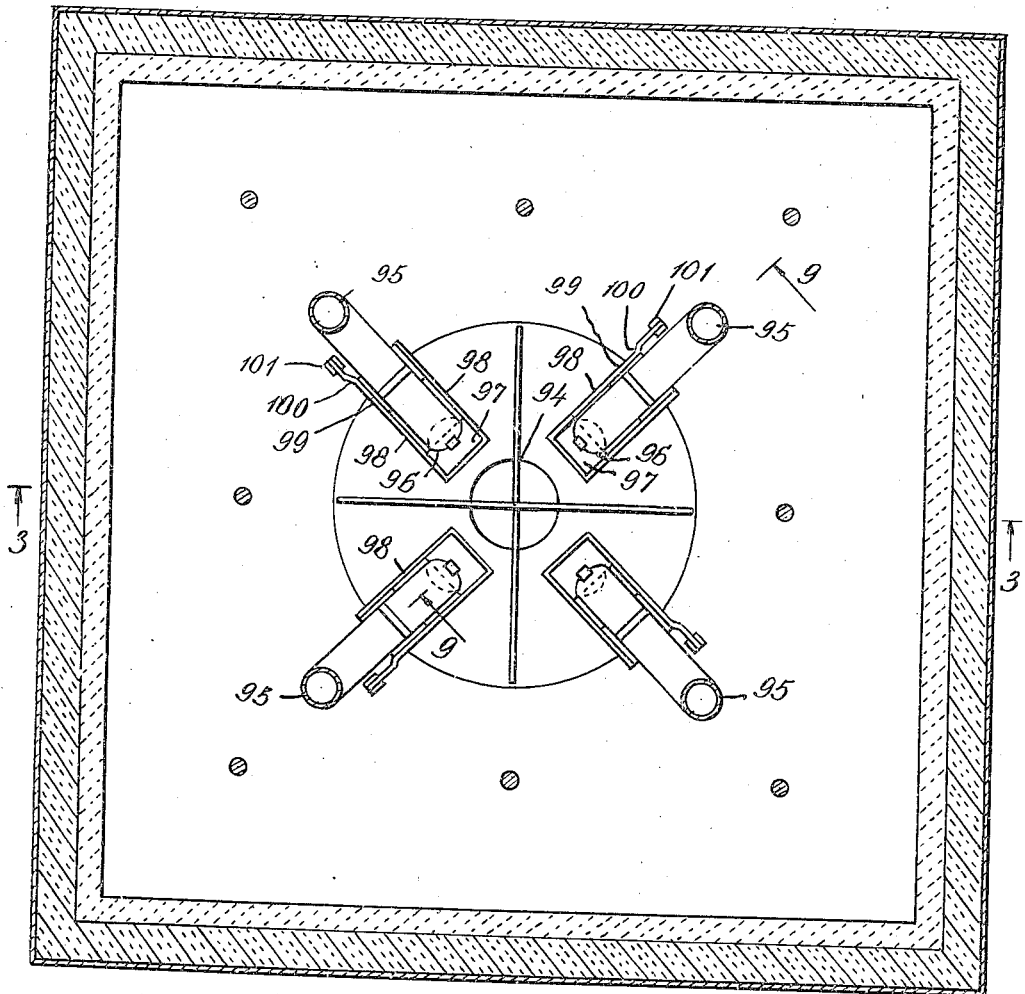
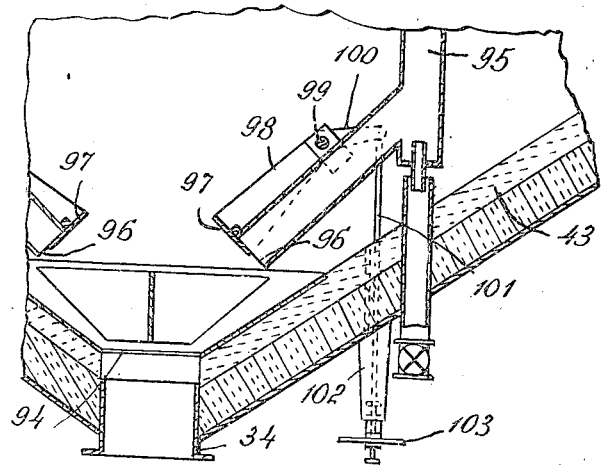
INVENTOR
Leroy F. Strader
BY
Pennie, Davis, Marvin & Edmonds
ATTORNEYS Patented Sept. 6, 1949

2,480,887

UNITED STATES PATENT OFFICE 2,480,887

APPARATUS FOR CATALYST REGENERATION

Leroy F. Strader, Long Beach, Calif., assignor, by mesne assignments, to Houdry Process Corporation, Wilmington, Del., a corporation of Delaware Application June 20, 1945, Serial No. 600,475

2 Claims. (Cl. 23—288)

My invention relates to improvements in kilns for regenerating spent pelleted catalysts used to promote the cracking of hydrocarbons. The regeneration involves burning off of the coke deposited on the catalyst as an incident of the cracking reaction. My invention relates particularly to vertical shaft kilns to the upper end of which spent catalyst is charged, from the lower end of which regenerated catalyst is discharged through a central discharge port and in which a charge of catalyst moving downwardly through the kiln is blown with air to burn off the coke. In such kilns it is important that the movement of catalyst downwardly through the kiln be substantially uniform across the entire shaft throughout the combustion zone. Otherwise irregularities in burning occur, the efficiency and capacity of the kiln are reduced, and frequently irregularities in movement become abrupt or periodic or both imposing severe stresses on the kiln structure and adding to the degradation of catalyst resulting from irregular burning.

To distribute the downward flow of catalyst across the shaft, it is customary to arrange one or more horizontal baffles, collector plates, across the shaft above the central discharge port, the lowermost baffle being provided with a plurality of sub-ports spaced symmetrically around the axis of the shaft and discharge port, the next above being provided with groups of sub-ports, each group being positioned symmetrically with respect to one of the ports in the next lower baffle, and so on. Such multiple division and subdivision of the flow of catalyst might accomplish fairly uniform distribution of flow if all of the catalyst pellets were perfectly symmetrical, of uniform size and density, and of uniform surface condition, but in a real kiln irregularities appear, irregularities such as fines and fragments and variations in density and surface, which involve irregularities in flow. Unlike a liquid, a piled solid, as in the piles beneath each sub-port in the baffles of the arrangement just described, does not flow smoothly or continuously. Instead, the piled solid flows in a series of slides or avalanches; as the angle of the surface of the pile in any particular region exceeds the angle of repose a slide eventually occurs until the angle of the surface in that region is somewhat less than the angle of repose and the removal of material by a slide or slides in lower regions produces, in the same manner, slides in higher regions in the pile. The effect is somewhat like the progress of rain drops downwardly across a large window pane in a rain fall too light to wet and wash the pane except that it is upside down, the rain drops initiating successions of runs from above whereas successions of slides of the piled solid are initiated from below. The region involved in any one slide may be small or may be large, depending on the integrated effect of variables such as those mentioned. If the slides are short and frequent and well distributed, the effect may approximate an equivalent of uniform flow and uniform distribution of flow, but if irregularities occur they tend to be cumulative and frequently involve ultimate disturbances of destructive magnitude, disturbances which impose severe stresses on the kiln structure and which involve degradation of the catalyst. Long and infrequent slides cannot be tolerated even though fairly regular because of the forces involved; the catalyst flow through such a kiln may amount to as much as 150 tons per hour or more and the charge at any moment may substantially exceed 150 tons.

To suppress one type of irregularity of flow in such kilns of square cross-section, it has been proposed to arrange a horizontal baffle across the shaft, below the combustion zone and spaced above the central discharge port, provided with four sub-ports each positioned centrally of one of four squares constituting a crossing quarter of the baffle and to arrange four discharge tubes beneath the baffle, each positioned to receive catalyst flowing downwardly through one of the sub-ports and each extending vertically downward from the baffle for a minimum distance of two, or better three, diameters and then inclining toward the vertical axis of the shaft and central discharge port for a minimum distance of two, or better three, diameters at an angle steeper than the angle of repose of the catalyst to a terminal opening short of that axis but closer to the axis than the sub-port with which that tube communicates. Additional collector baffles may be arranged, as in conventional practice, above the baffle associated with the discharge tubes just described.

I have found that the combination of such discharge tubes with the sub-ports of the lowermost collector baffle in such kilns is improved, in terms of the uniformity of catalyst flow attained in application, by the provision of means for regulating the relative flow through each of the discharge tubes. This I accomplish by providing gates, corresponding in number to the discharge tubes, adapted to move across the several terminal openings of the discharge tubes with an independent operating extension for each gate adapted to move the gate across and position it with respect to the terminal opening of the associated discharge tube from a point without the kiln. I have in this manner been able to accomplish regularity of the relative flow through the several discharge tubes without introducing any new element itself tending to disturb uniformity of flow. My invention is useful in connection with vertical shaft kilns of square cross-section, but it is also useful generally in connection with vertical shaft kilns of any cross-section provided with a final collector baffle provided with a plurality of sub-ports spaced symmetrically around the axis of the shaft and discharge port.

The accompanying drawings illustrate apparatus embodying my invention. Although diagrammatic and conventional, these drawings are in general of scale proportions although in some instances, notably in Figure 2, parts have been spaced to promote clarity of illustration. Referring to these drawings:

Figure 1 is a flow diagram of a cracking system embodying a kiln at the left of the drawing, of the type to which my invention relates, Figure 2 is an elevation of a kiln such as that illustrated in Figure 1, Figure 3 is an enlarged section of the lower part of the kiln illustrated in Figure 2, on the line 3—3 of Figure 4, Figure 4 is an enlarged section of the lower part of the kiln illustrated in Figure 2 taken at right angles to the section constituting Figure 3, on line 4—4 of Figure 3, Figure 5 is a section on line 5—5 of Figure 3, Figure 6 is a section on line 6—6 of Figure 3, Figure 7 is a section on line 7—7 of Figure 3, Figure 8 is an enlarged section on line 8—8 of Figure 3, Figure 9 is an enlarged fragmentary section on line 9—9 of Figure 8, and Figure 10 is a fragmentary section of any of the beam ducts associated with distributing or collecting troughs in the several sections illustrated in Figures 3 and 4.

Referring to Figure 1 as a diagram of the cracking operation as a whole: A charge of catalyst is maintained in a reactor 20, the regenerated catalyst being supplied from storage chamber 22 through connection 21 and spent catalyst being discharged through connection 23. The temperature in the reactor may approximate, for example, 900°–975° F. and the pressure in the reactor may approximate 6–10 lbs. per square inch gauge. Connection 21 is made long enough to serve as a seal. The hydrocarbons to be cracked are introduced into the reactor as a vapor mixture through connection 24. Steam to strip the spent catalyst leaving the reactor of vaporizable material is introduced through connection 25. The cracked hydrocarbons together with any uncracked material and the stripping steam leave the reactor as a vapor mixture through connection 26. Spent catalyst is lifted to the top of the kiln 27 by means of bucket elevator 28, entering the kiln through connection 42. Any fresh catalyst required to maintain the volume of catalyst in circulation in the system is introduced through connection 29 and lifted to the top of the kiln 27 by means of elevator 28 together with the spent catalyst. The catalyst moves downwardly through the kiln through a series of bodies in a corresponding series of zones through which air is blown by means of blower 30 and distributing ducts or manifolds 31 with appropriate connections to each of the several zones. The products of combustion escape from each of the several zones through ducts or manifolds 32, ultimately escaping through stack 33. The regenerated catalyst discharged from the lower end of the kiln through connection 34 is lifted to the catalyst storage chamber 22 by means of bucket elevator 35. Part of the regenerated catalyst passes from the head of elevator 35 directly to chamber 22 through connection 36. Another part, 5%–10% of the total for example, passes through connection 37 to an elutriator 38. In this elutriator this diverted part of the regenerated catalyst falls through a rising stream of part of the gases passing to the stack, the fines being carried off with the gases and the coarser material returned through connection 39 to the foot of the elevator 35. Or, the coarser material may be returned, through an appropriate seal, directly to the top of the kiln. Before escaping through the stack 33 the products of combustion pass through a series of cyclone separators 40 in which fines carried out of the elutriator together with any fines carried out of the kiln proper are separated and discharged through connection 41. The kiln, the catalyst storage chamber, the reactor, the elevators and the several connections through which the catalyst passes are thermally insulated to minimize heat loss. By passing fresh catalyst through the kiln as it enters the system, such fresh catalyst is brought to the same temperature as the bulk of the circulating catalyst before it enters the catalyst storage chamber or the reactor.

Referring to Figure 2 as an illustration of a kiln of the type to which my invention relates: The kiln comprises a rectangular thermally insulated and refractory lined shell 43. To promote uniform distribution of the catalyst over a horizontal section of the kiln, a distributor plate 44 carrying nine distributing tubes 45 is arranged at the upper end of the kiln, and to promote uniform flow of the catalyst downwardly through the kiln a series of baffles or collector plates 46, 47, 48 and 49 each carrying appropriately arranged distributing ports or tubes is provided in the lower part of the kiln. A horizontal grid 90 is arranged above the baffle 46 and below the combustion zone in the kiln. This grid is constructed of a plurality of deep and narrow spaced bars 91 extending entirely across the shaft. The several bars 91 making up the grid 90 are supported in position by a series of transverse spacer and support bars 92, to which the bars 91 are welded, the spacer and support bars 92 in turn being supported from plate 46 by legs at appropriate intervals. In operation, spent catalyst is charged into the upper end of the kiln through connection 42 and regenerated catalyst is discharged from the lower end of the kiln through connection 34, the kiln being maintained substantially full of catalyst between the lower ends of the distributing tubes 45 and the distributor plate 46. This charge of catalyst is divided into ten bodies by nine groups of tubes 51, 52, 53, 54, 55, 56, 57, 58 and 59 through which a cooling medium is circulated, each of these bodies being within a zone independent of the others for control purposes. Another and a somewhat larger group of cooling tubes 50 is arranged beneath the tenth body. For convenience of reference these several zones are numbered in Figure 2 (and in Figure 3), the zone through which the catalyst first passes being numbered 1 and the zone through which the catalyst last passes being numbered 10. A grid of distributing troughs for introduction of air is arranged centrally of each zone and is connected to the air manifolds 31 through beam ducts 74. A pair of grids of collecting troughs is arranged above and below these distributing troughs in each zone and is appropriately connected to stack manifolds 32 through beam ducts 80. Valved connections are provided for introducing steam, from manifold 60, into the grid of distributing troughs in each of the ten zones as may be required. Valved connections 71 and 72 are also provided for introduction of steam, from manifold 60, into the uppermost grid of collecting troughs in zone 1 into the stack manifolds 32 as a cooling agent, or, in an emergency as a smothering agent. The several connections between the manifold 60 and the several zones may also be used in an emergency to introduce steam as a smothering agent.

Referring particularly to Figures 3, 4, 8 and 9 as a more detailed illustration of the embodiment of my invention in a kiln such as that illustrated in the drawings: The shaft of the kiln illustrated is square in section. A central discharge port 94 is provided at the lower end of the shaft for discharge of regenerated catalyst to connection 34. The several horizontal baffles or collector plates 46, 47, 48 and 49 are vertically spaced in the shaft at the central discharge port 94, each of these baffles being provided with discharge ports or tubes, as shown. The lowermost baffle 49 is provided with four sub-ports 93 each positioned centrally in one of four squares constituting a corner quarter of the baffle (see Figure 7). Beneath the baffle 49 I arrange four discharge tubes 95, each positioned to receive catalyst flowing downwardly through one of the sub-ports 93. Each of the four discharge tubes 95 extends vertically downward from the baffle for a minimum distance of 2, or better 3, diameters, (of the discharge tube) and then inclines toward the vertical axis of the shaft, and of the central discharge port 94, for a minimum distance of 2, or better 3, diameters at an angle steeper than the angle of repose of the catalyst to a terminal opening 96 (see Figure 3) short of the shaft axis but closer to that axis than the sub-port with which the discharge tube communicates. A gate 97 carried by a pair of arms 98 pivoted at 99 is arranged so that the gate 97 can be moved across the terminal opening 96 of each of the discharge tubes. One of each pair of the arms 98 is extended to form a crank 100 connected through an extension 101 movable through a gland 102 to a hand wheel 103 located outside of the kiln. The lower end of the extension 101 is threaded and the hand wheel 103, correspondingly threaded and secured to the lower end of the gland 102 by a collar permitting rotation without vertical movement, thus permits the operator to move the gate across the terminal opening and to position it with respect to the terminal opening, thereby to secure effective control of the relative flow through the several discharge tubes 95 associated with the four supports 93 in the lowermost baffle 49, during operation. The gates 97 are arranged to be moved upwardly to decrease restriction of the terminal opening of the discharge tube from the position of maximum restriction at the lowest point in their travel. Since catalyst discharged through the terminal opening tends to pile below the terminal opening, and itself to restrict or stop the flow when the pile covers the terminal opening, or as much of that opening as is exposed by the gate, the gate, in any particular position when arranged as illustrated, fixes the effective size of the terminal opening without, however, interfering with the catalyst flow below that opening.

I claim:

1. In a regenerating kiln comprising a vertical shaft, means for charging spent catalyst to the upper end of the shaft and means for discharging regenerated catalyst from a central discharge port at the bottom of the shaft, a horizontal baffle spaced above the discharge port, sub-ports in this baffle spaced symmetrically around the axis of the shaft and discharge port, a corresponding number of discharge tubes each positioned to receive catalyst flowing downwardly through one of the sub-ports, each of these discharge tubes extending vertically downward from the baffle for a minimum distance of two diameters and then inclining toward the vertical axis of the shaft and discharge port for a minimum distance of two diameters at an angle steeper than the angle of repose of the catalyst to a terminal opening short of that axis but closer to it than the communicating sub-port, the improvement which comprises gates corresponding in number to the discharge tubes, each gate being adapted to move across the terminal opening of one of the discharge tubes, and an independent operating extension for each gate adapted to move the gate across and position it with respect to the terminal opening of the associated discharge tube from a point without the kiln.

2. In a regenerating kiln comprising a vertical shaft, means for charging spent catalyst to the upper end of the shaft and means for discharging regenerated catalyst from a central discharge port at the bottom of the shaft, a horizontal baffle spaced above the discharge port, sub-ports in this baffle spaced symmetrically around the axis of the shaft and discharge port, a corresponding number of discharge tubes each positioned to receive catalyst flowing downwardly through one of the sub-ports, each of these discharge tubes extending vertically downward from the baffle for a minimum distance of two diameters and then inclining toward the vertical axis of the shaft and discharge port for a minimum distance of two diameters at an angle steeper than the angle of repose of the catalyst to a terminal opening short of that axis but closer to it than the communicating sub-port, the improvement which comprises gates corresponding in number to the discharge tubes, each gate being adapted to move across the terminal opening of one of the discharge tubes, upwardly from the position of maximum restriction of the opening, and an independent operating extension for each gate adapted to move the gate across and position it with respect to the terminal opening of the associated discharge tube from a point without the kiln.

LEROY F. STRADER.

REFERENCES CITED

The following references are of record in the file of this patent:

UNITED STATES PATENTS

| Number | Name | Date |
|---|---|---|
| 1,100,397 | Reynolds | June 16, 1914 |